(12) United States Patent
Frew

(10) Patent No.: US 9,345,263 B1
(45) Date of Patent: May 24, 2016

(54) VEGETABLE WASHER

(71) Applicant: Joseph N. Frew, Reeds Spring, MO (US)

(72) Inventor: Joseph N. Frew, Reeds Spring, MO (US)

(*) Notice: Subject to any disclaimer, the term of this patent is extended or adjusted under 35 U.S.C. 154(b) by 0 days.

(21) Appl. No.: 14/640,580

(22) Filed: Mar. 6, 2015

Related U.S. Application Data

(60) Provisional application No. 61/948,913, filed on Mar. 6, 2014.

(51) Int. Cl.
*A23N 12/02* (2006.01)

(52) U.S. Cl.
CPC .............. *A23N 12/023* (2013.01); *A23N 12/02* (2013.01)

(58) Field of Classification Search
CPC ............................. A23N 12/02; A23N 12/023
See application file for complete search history.

(56) References Cited

U.S. PATENT DOCUMENTS

| | | | | |
|---|---|---|---|---|
| 670,457 A | * | 3/1901 | Ruggles | A23N 12/005 15/3.15 |
| 1,296,131 A | * | 3/1919 | Stebler | A23N 12/02 118/DIG. 6 |
| 2,233,611 A | * | 3/1941 | Hollenbeck | A23N 12/02 15/3.17 |
| 2,273,020 A | * | 2/1942 | Chater | A23N 12/02 15/3.17 |
| 2,412,430 A | | 12/1946 | Suelflow | |
| 2,578,944 A | * | 12/1951 | Ramont | A23N 12/005 15/3.15 |
| 2,801,598 A | * | 8/1957 | Dumas | A23G 7/0006 15/3.11 |
| 4,173,051 A | | 11/1979 | Reid | |
| 4,601,080 A | | 7/1986 | Cook | |
| 4,744,379 A | | 5/1988 | Goettel | |
| 5,331,702 A | * | 7/1994 | Willsey | A63B 47/04 134/131 |
| 5,562,114 A | | 10/1996 | St. Martin | |
| 5,758,378 A | * | 6/1998 | Kristensen | A01K 43/005 15/3.14 |
| 6,508,257 B1 | | 1/2003 | Rich | |
| 7,905,962 B1 | | 3/2011 | Di Panni | |

* cited by examiner

*Primary Examiner* — Randall Chin

(74) *Attorney, Agent, or Firm* — Robert C. Montgomery; Montgomery Patent & Design LP.

(57) ABSTRACT

An apparatus adapted to provide a washing and cleaning system for vegetables in a restaurant environment includes a stationary lower frame having a plurality of cylindrical scrub brushes, and an operable and manually movable upper brushing assembly. Vegetables progress between the upper and lower brushes resulting in the removal of dirt and debris.

20 Claims, 5 Drawing Sheets

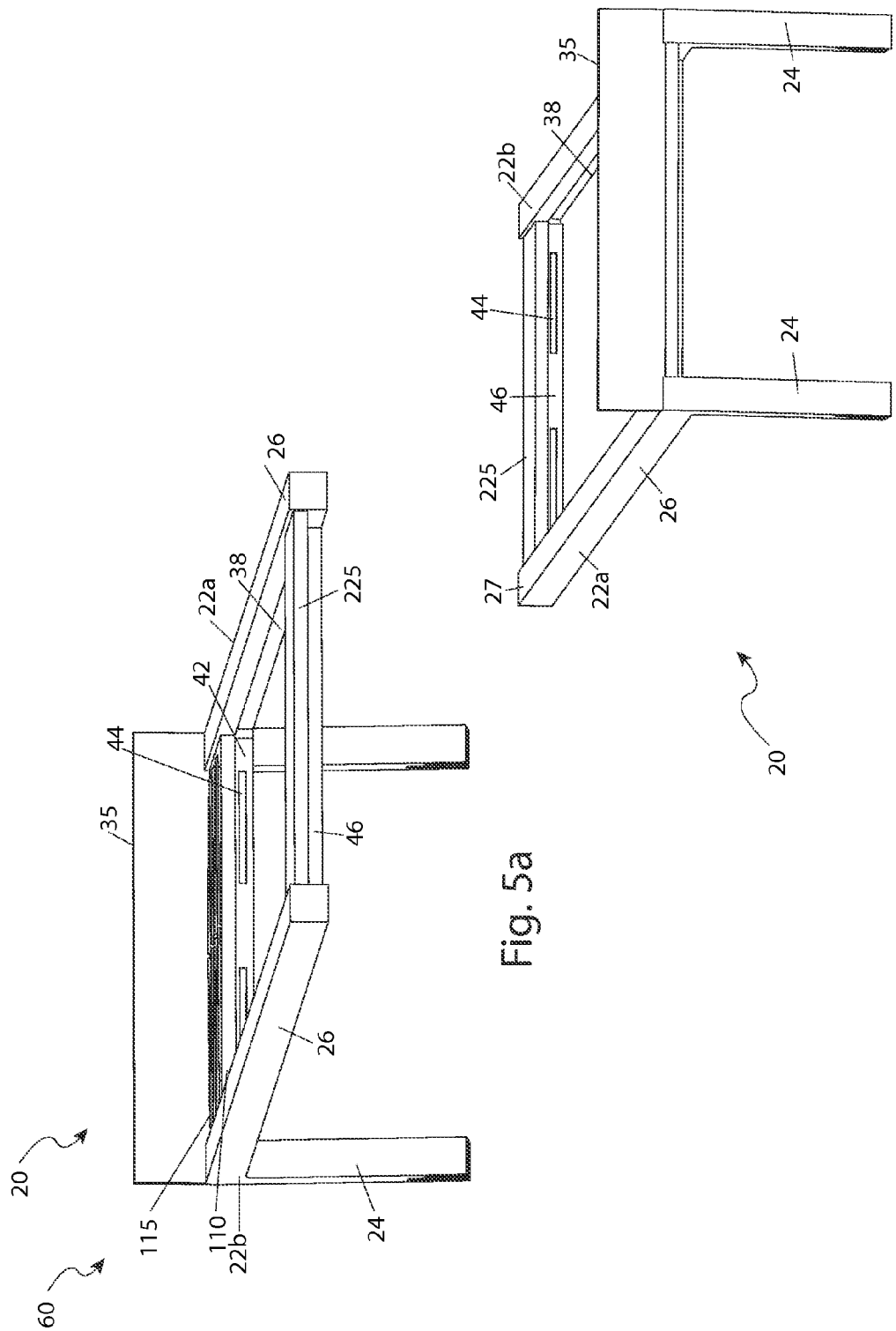

VEGETABLE WASHER

RELATED APPLICATIONS

The present invention is a continuation-in-part of, was first described in, and claims the benefit of U.S. Provisional Application No. 61/948,913, filed Mar. 6, 2014, the entire disclosures of which are incorporated herein by reference.

FIELD OF THE INVENTION

The present invention relates to a wash tray with a rail brush assembly to improve and expedite the preparation of foodstuffs in a kitchen.

BACKGROUND OF THE INVENTION

Root vegetables, such as potatoes, are used in almost every kind of food and from every nationality. They can be found at lunches, dinners, and even breakfasts. As a natural food, they are very healthy. Such root vegetables are a good source of potassium, iron, vitamin C, fiber, protein while containing no fat or cholesterol, and only a small amount of sodium. However, because they grow in the ground, they do suffer from the fact that they must be rigorously cleaned as the first part of their preparation. While cleaning a few root vegetables for dinner at home is not a big burden, it is a significant task for those who prepare many root vegetables in a restaurant, commercial, or institutional environment. Such a prep cook may spend hours cleaning hundreds of root vegetables while hunched over a sink in a position that can cause pain in the lower back. Additionally, the labor associated with such cleaning drives up the cost of food for everyone. Accordingly, there exists a need for a means by which a large amount of root vegetables can be easily cleaned. The development of the present invention fulfills this need.

SUMMARY OF THE INVENTION

It is therefore an object of the present invention to provide such a vegetable washing device that has a tray formed as a inclined plane and defining a loading area and an exit area, a scrub brush array attached to the tray, a rail brush assembly slidable motionable along a longitudinal axis of the tray, and a water pan affixed to a bottom of the tray. The device is designed to cleanse a root vegetable loaded at the loading area and agitated by the rail brush assembly along the scrub brush array, and convey the root vegetable to the exit area. The water pan acts as a sump to receive water introduced at the loading area such that the scrub brush array can use water to scrub the root vegetable. In a preferred embodiment, the device is capable and sized to be secured to and utilize a conventional three-basin sink assembly.

Another object of the present invention is to provide such a tray that has a pair of parallel side frames, each with a leg portion deflected off at an angle. A feed plate is affixed to an upper portion of the side frames adjacent to the legs. At least one (1) embodiment of the feed plate has angled ridges on the upper surface to direct the flow of water towards the scrub brush array. At least one (1) embodiment of the feed plate has a plurality of ribs on a lower surface to provide rigidity.

Yet another object of the present invention provides for at least one (1) groove to extend inward from distal ends of the leg portions of the side frames. The grooves enable the device to securely rest on a perimeter rim of a sink.

Yet another object of the present invention provides for a backsplash to be affixed to an upper surface of the face plate above the leg portions.

Still yet another object of the present invention is to provide a scrub brush array that is attached to a lower portion of the side frames. The array includes a rectangular frame having a loading member, an exit member, and a pair of parallel members having a longitudinal split portion enabling attachment of a plurality of axles. Each axle extends outward from a shaft that in at least one (1) embodiment is cylindrical. A plurality of bristles are attached to the outer surface of each shaft. A key plate, attached to a lower surface of the feed plate, receives tabs located on the loading member. An adjustable clamp attached to the exit plate receives tabs located on the exit member.

Yet another object of the present invention provides for the rail brush assembly to include pair of parallel guide rails, each attached to a respective side frame, to receive a rail brush housing. The guide rails extend from the backsplash to the exit end. In at least one (1) embodiment, the guide rails extend beyond the exit end of the device. The rail brush housing has a handle on an upper surface, a rail brush head on a first area of a lower surface, a soaking brush on a second area of the lower surface, and an outwardly extending extender bar adjacent to the soaking brush. In at least one (1) embodiment the rail brush head is a plurality of uniformly-shaped pieces. In at least one (1) embodiment the soaking brush is a semi-circular shape.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 5a is an isolated view of a key plate 42 in a tray 20 of the root vegetable washer 10 in accordance with the preferred embodiment of the present invention; and, FIG. 5b is an isolated view of an adjustable clamp 46 in the tray 20 of the root vegetable washer 10 in accordance with the preferred embodiment of the present invention.

DESCRIPTIVE KEY

Figure 1:
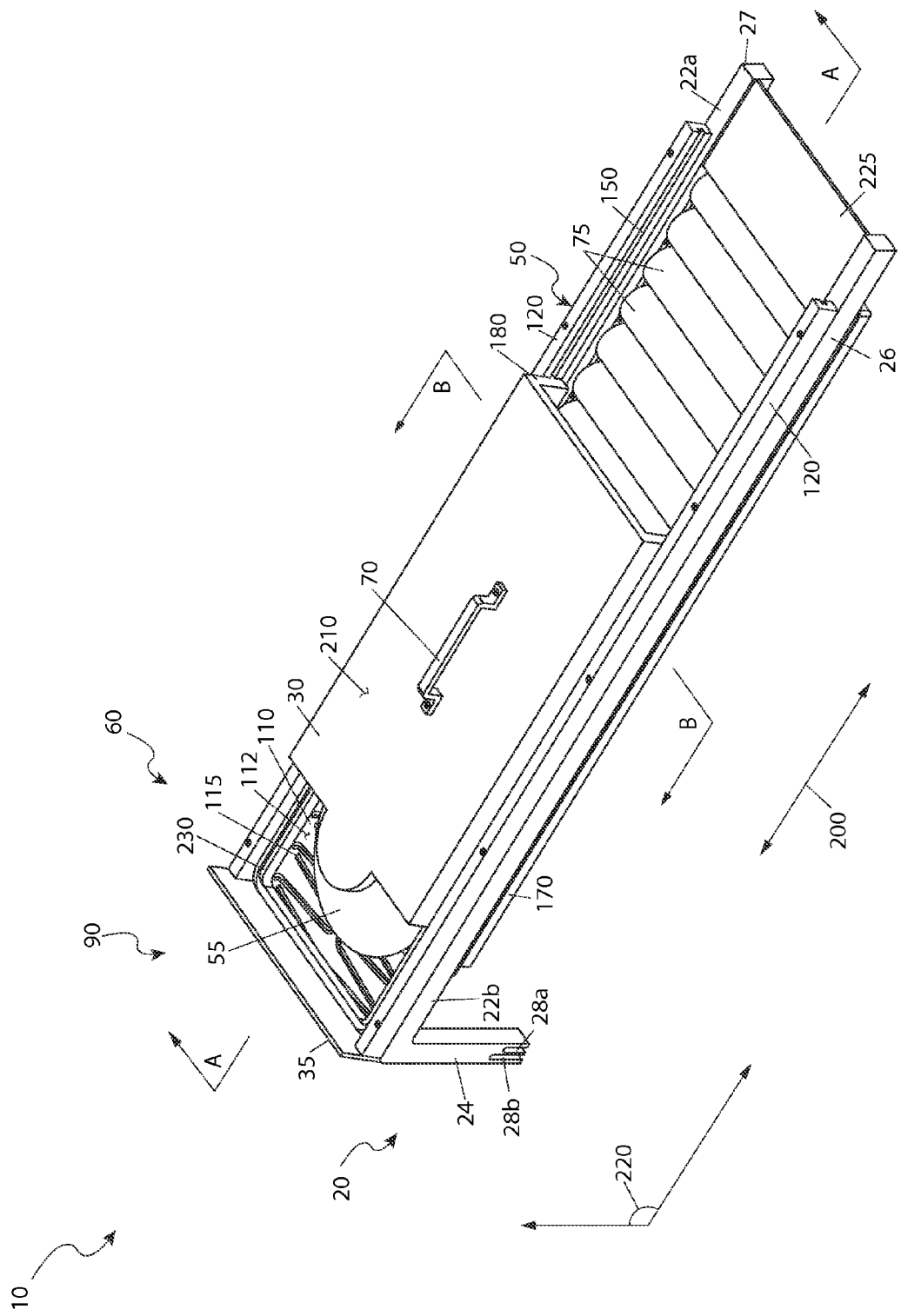
FIG. 1 is an isometric view of a root vegetable washer 10, in accordance with the preferred embodiment of the present invention.

10 vegetable washer
15 vegetable
20 tray
22a first side frame
22b second side frame
24 leg
26 bar member
27 exit end
28a first leg groove
28b second leg groove 30 rail brush assembly
32 brush housing
35 backsplash
38 undercut
42 key plate
44 socket
46 adjustable clamp
50 scrub brush array
55 sop brush
60 loading area
70 handle
75 cylindrical brush
80 brush shaft
85 brush bristles
87 axle
90 forward end
110 feed plate
112 top face
115 ridge
120 guide rail
130 brush frame
132 first end member
134 second end member
136a first split member
136b second split member
138 axle aperture
142 tab
144 fastener
145 protrusion
150 channel groove
170 water pan
180 lateral member
190 upper brush head
195 upper brush bristles
200 longitudinal motion
210 upper surface
220 incline
225 exit plate
230 extender arm

DETAILED DESCRIPTION OF THE PREFERRED EMBODIMENT

The best mode for carrying out the invention is presented in terms of its preferred embodiment, herein depicted within FIGS. 1 through 5b. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a vegetable washer (herein referred to as the "device") 10, being equipped with a tray 20 and a rail brush assembly 30 to improve and expedite the preparation of foodstuffs, such as vegetable 15, in a kitchen, by quickly washing the vegetable 15 via a scrub brush array 50 of the device 10. The invention is particularly suitable for washing dirt and grime from root vegetables which grown in the ground.

Figure 2:
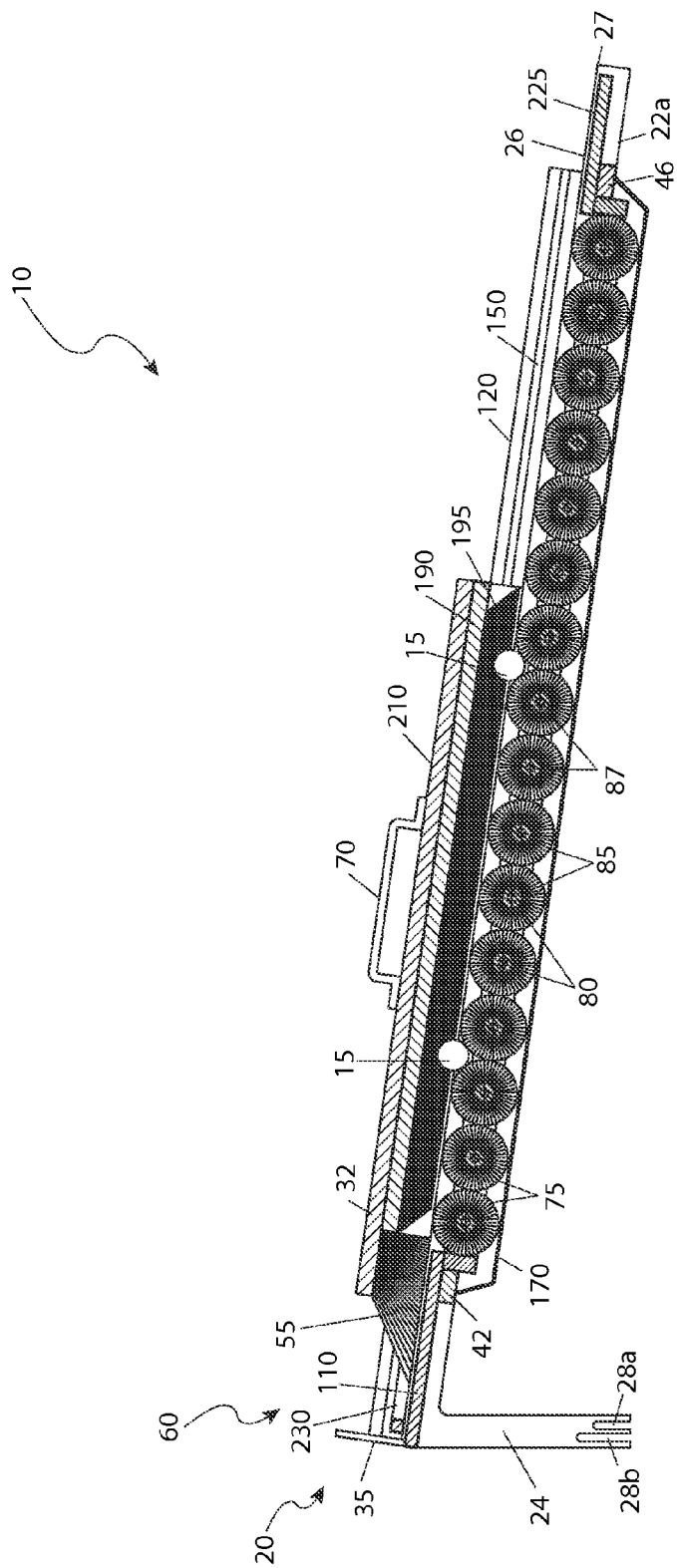
FIG. 2 is a section view along line A-A as seen in FIG. 1 of the root vegetable washer 10, in accordance with the preferred embodiment of the present invention.
Figure 3:
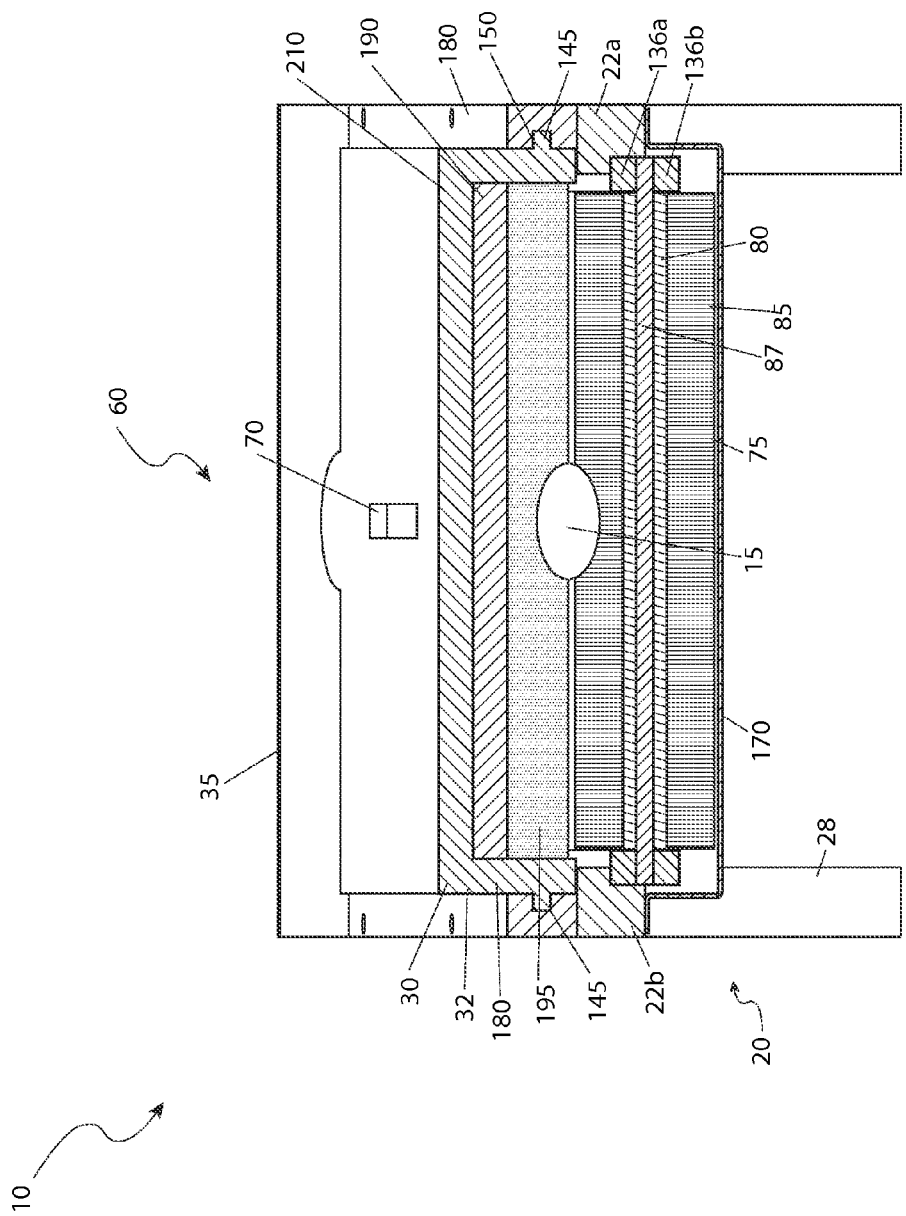
FIG. 3 is a section view along line B-B as seen in FIG. 1 of the root vegetable washer 10 in accordance with the preferred embodiment of the present invention.

Referring now to FIG. 1, an isometric view, FIG. 2, a section view along line A-A as seen in FIG. 1, and FIG. 3, a section view along line B-B as seen in FIG. 1, of the device 10, in accordance with the preferred embodiment of the present invention, are disclosed. The device 10 provides a tray 20, a rail brush assembly 30, a scrub brush array 50, and a water pan 170, which collectively act as a cleaning and conveyance system to direct the vegetables 15 through the device 10 and into a third basin of an existing washtub or sink. The tray 20 includes a first side frame 22a and a mirrored second side frame 22b. The side frames 22a, and 22b are each be composed of an extruded square, or rectangular, thermoplastic shape formed having a vertical leg 24 and a bar member 26 disposed at an acute included angle so as to fall upon a negative incline 220. Other shapes, such as a hollow square, or rectangular tube, or other materials, such as some metals, or wood, may be utilized without limiting the scope of the device 10. The side frames 22a, 22b occupy a horizontal distance of approximately forty two inches (42 in.) from the leg 24 to the exit end 27. The legs 24 are configured to result in a total height of the side frames 22a and 22b of approximately seven inches (7 in.).

Disposed in each leg 24 of the side frames 22a, 22b are a first leg groove 28a and a deeper second leg groove 28b. The leg grooves 28a, 28b are vertical slots cut, or formed, into the legs 24 in a perpendicular orientation to the longitudinal axis of the bar member 26. As previously stated, the second leg groove 28b is cut more deeply into the legs 24 than the first leg groove 28a. The purpose of the leg grooves 28a and 28b is to accommodate the insertion of the material of the sink separator therein so as to secure the positional placement of the device 10 relative to the sink. The deeper second leg groove 28b will permit a placement of the device 10 at a smaller incline 220 than the engagement of the sink separator into the first leg groove 28a by virtue of a geometric relationship. The device 10 is envisioned to be made available in various sizes for commercial and private applications, and as such the dimensions provided in this preferred embodiment should not be interpreted as a limitation of scope. The previous dimensions are envisioned to be suitable for positioning of the device 10 upon an existing three-compartment sink as is found in many restaurants or commercial kitchens.

The side frames 22a and 22b are connected at a first end, in proximity to the legs 24, by a planar feed plate 110. The feed plate 110 is a rigid thermoplastic plate attached to interior faces of the side frames 22a, 22b, either permanently, by some thermoforming process, or removably, by means of threaded fasteners or other similar securement means. The utilization of threaded fasteners, or other interlocking features, to attach the feed plate 110 to the side frames 22a, 22b may require the additional incorporation of shaped apertures or other formed projections; however, it is understood that any such eventualities do not modify the scope, or the intent, of the present device 10, and this preferred embodiment does not preclude other embodiments. Other materials, such as certain metals, wood, or composites, may be utilized, with the previously stated qualifications, without limiting the scope of the device 10. The feed plate 110 may be provided with any type of projections on a lower surface, such as ribs, or the like, to provide additional flexural rigidity thereto in order to withstand the forces induced during use. The feed plate 110 is attached to the side frames 22a, 22b having a top face 112 in a parallel disposition to the bar members 26 so as to be placed at an equal incline 220. The combined width across the side frames 22a, 22b, and the feed plate 110 will be approximately twelve inches (12 in.). Disposed upon the top face 112 of the feed plate 110 is a plurality of angled ridges 115 configured to spread a flow of water from a faucet, or other convenient source, impinging on that top face 112 generally evenly across the feed plate 110.

A key plate 42 is attached along a lower face of the feed plate 110 between the first side frame 22a and the second side frame 22b as more clearly illustrated in FIG. 5a. The purpose of the key plate 42 will be explained at a later point in this narrative.

A backsplash 35 is also attached along the feed plate 110 spanning the distance of the first side frame 22a and the second side frame 22b. The backsplash 35 is a rigid thermoplastic plate oriented perpendicular, or nearly perpendicular, to the feed plate 110. The backsplash 35 is configured to obviate a flow of water over a first end of the side frames 22a, 22b. The feed plate 110 and the backsplash 35 comprise a loading area for the vegetables 15 to be cleaned within the device.

The tray 20 includes a scrub brush array 50 incorporating a plurality of cylindrical brushes 75 mounted upon axles 87 about which a rotating motion can be achieved. The cylindrical brushes 75 are configured to be a cylindrical brush shaft 80, preferably composed of an extruded thermoplastic with brush bristles 85 projecting radially therefrom. Other materials, such as wood, or composites, may be utilized without limiting the scope of the device 10. The brush bristles 75 are composed of nylon or other suitable natural or synthetic material. The cylindrical brushes 80 are envisioned to be confined within a brush frame 130 which will be explained in greater detail elsewhere in this narrative.

An exit plate 255 is attached between the first side frame 22a and the second side frame 22b at the exit end 27 of the bar members 26. The exit plate 255 is a planar rigid thermoplastic plate similar to the feed plate 110 provided with a smooth upper face. The feed plate 255 is configured to be attached to the side frames 22a, 22b longitudinally parallel to the bar members 26 so as to be at an equal incline 220. An adjustable clamp 46 is slidingly attached to a lower face of the exit plate 225 as depicted in FIG. 5b.

A water pan 170 is removably attached to a lower side of the tray 20. The water pan 170 is a thermoplastic tray having a planar bottom attached to short encircling sidewalls along abutting edges. Other materials, such as certain corrosion resistant metals, may be utilized without limiting the scope of the device 10. The water pan 170 may be provided with a perpendicular flange along part, or all, of the sidewall. The water pan 170 may be attached to the side frames 22a, 22b, and other portions tray 20 as well, by means of removable fasteners or by means of the retention of keyhole slots slidingly received upon headed pins permanently fixed to appropriate locations on the tray 20. In use, the water pan 170 provides a sump, subjacent to the scrub brush array 50, for the retention of some water which is envisioned to be flowing from a faucet and striking the feed plate 110. The water retained within a least some portion of the water pan 170 is held in contact with some of the partially submerged cylindrical brushes 75 of the scrub brush array 50 to assist with the removal of any undesirable material from the vegetable 15.

A pair of guide rails 120 is attached to an upper surface of the side frames 22a, 22b by means of a plurality of threaded fasteners. The guide rails 120 are configured to be rectangular thermoplastic bars with a square-cut channel groove 150 along a majority of the length of an inner face thereof. The guide rails 120 extend from the backsplash 35 at a first end to just beyond the exit plate 225 at a second end. An outer face of the guide rails 120 is intended to be flush with the outer face of the bar member 26 of each side frame 22a, 22b while not spanning the entire width of the bar member 26.

A rail brush assembly 30 is configured to be placed between the guide rails 120 to be activated in a longitudinal motion 200 for the purpose of imparting a reciprocating scrubbing action to the vegetable 15. The rail brush assembly 30 consists of an upper brush head 190 affixed within a brush housing 32. The brush housing 32 is generally "U" shaped with a horizontal planar member formed with a pair of downturned vertical lateral members 180. The lateral members 180 are formed with a generally square protrusion 145 extending from each outside face. The protrusion 145 is configured to be inserted into the channel groove 150 of each guide rail 120 to constrain the movement of the rail brush assembly 30 to the longitudinal motion 200. The upper brush head 190 may be composed of a single piece, or a plurality of uniformly shaped pieces into which upper brush bristles 195 are embedded. The upper brush bristles 195, also preferably nylon, are configured to be angled away from the loading area 60 at approximately forty five degrees (45°). This configuration results in a longitudinal motion 200 in the direction of the exit plate 225 will tend move the vegetable 15 along the scrub brush array 50 in the same direction, whereas the longitudinal motion 200 in an opposite direction will preferably result in the upper brush bristles 195 scrubbing over a stationary vegetable 15 to cleanse the vegetable 15.

A semi-circular sop brush 55 is affixed to a projecting portion of the brush housing 32 on that side in closest proximity to the feed plate 110. The soaking brush is configured to extend onto the feed plate 110 to define an extent of the longitudinal motion 200 toward the loading area 60. The sop brush 55 is composed of a highly absorbent material, such as a textile mop or an open-cell foam, or the like, to accumulate water coursing over the top face 112 of the feed plate 110 and apply that water liberally to the surface of the vegetable 15 and down onto the scrub brush array 50.

An extender arm 230 is permanently affixed to a side portion of the brush housing 32 near the sop brush 55. The extender arm 230 provides a confined space which serves as a rake or grappler to entrain each vegetable 15 at the feed plate 110 and convey the vegetable 15 into the rail brush assembly 30 and the scrub brush array 50. When the rail brush assembly 30 is displaced toward the exit plate 225, a vegetable 15 is incrementally advanced through the scrub brush array 50.

Extending from an upper surface 210 of the rail brush assembly 30 is an inverted "U"-shaped handle 70. The handle 70 is affixed to the upper surface 210 using fasteners such as screws, rivets, or the like, and enables a user to grasp the rail brush assembly 30 and force it to be displaced reciprocally in a longitudinal direction 200 along the tray 20. Preferably, the handle 70 is orientated parallel with a longitudinal center axis of the tray 20.

The device 10 is built upon a declining plane, indicated here as an incline 220, as previously stated to assist the transfer of the vegetable 15 through the device 10. The device 10 is envisioned to utilize moving water from at least one (1) existing faucet of the sink to wash the vegetable 15. The configuration of the preferred embodiment of the device 10, shown here, enables the cleansing of a plurality of vegetables 15 simultaneously. In use, the rail brush assembly 30 is moved to the loading area 60 with the extender arm 230 projecting over the feed plate 110. At least one (1) vegetable 15 is placed upon the loading area 60 of the device 10 within the reach of the extender arm 230. A user then moves the rail brush assembly 30 toward the exit plate 225 using the handle 70 to pull the vegetable 15, within the extender arm 230, into the scrub brush array 50. The longitudinal motion 200 is then reversed and the sop brush 55 is swabbed across the vegetable 15 and the now wetted vegetable 15 becomes engulfed by the rail brush assembly 30. Each successive reciprocating longitudinal motion 200 displaces the vegetable 15 across the subjacent scrub brush array 50 and through the rail brush assembly 30. Due to the natural curved shape of the vegetable 15, a vegetable 15 is transported down the incline 220 as it is assisted by gravity, the angled upper brush bristles 195, and the longitudinal motion 200 of the rail brush assembly 30, being applied by the user. Any released dirt, sand, or other foreign material will fall between the cylindrical brushes 75 of the scrub brush array 50 and into the water pan 170 and then ultimately into the sink upon which the device 10 is positioned. At this point, the vegetables 15 will exit from the device 10 over an exit plate 225, where it is envisioned the vegetable 15 will fall into the third compartment of the sink, being cleaned and ready for further preparation.

Figure 4:
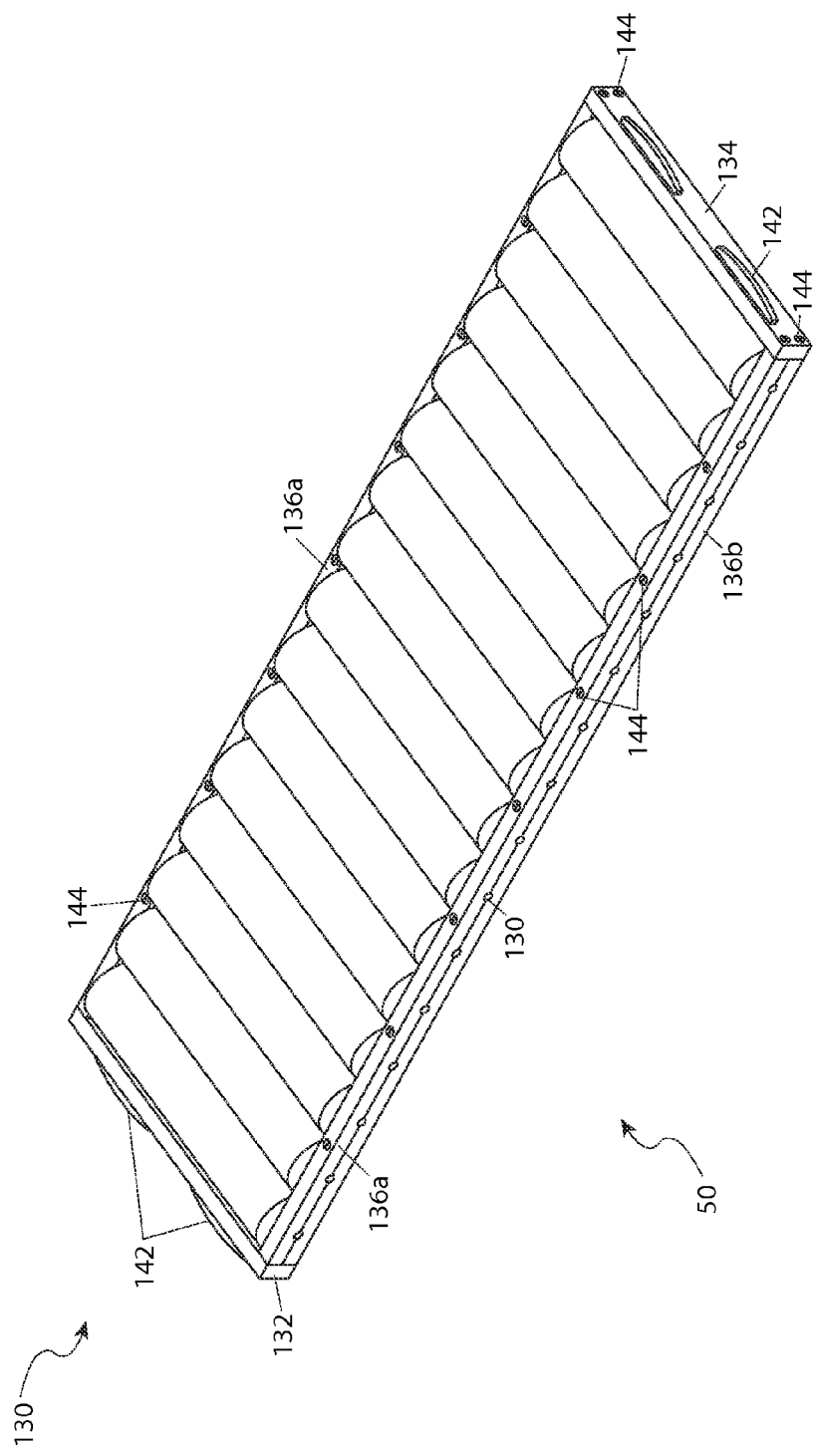
FIG. 4 is an isolated isometric view of a scrub brush array 50 of the root vegetable washer 10 in accordance with the preferred embodiment of the present invention.

Referring now to FIG. 4, an isolated isometric view of the scrub brush array 50, and FIG. 5a, an isolated view of the key plate 42, and 5b, an isolated view of the adjustable clamp 46, of the device 10, in accordance with the preferred embodiment of the present invention, are disclosed. Each of the first side frame 22a and the second side frame 22b is provided with an undercut 38 along a lower, inner corner of the bar member 26. The undercut 38 is configured to be a void into which the first split members 136a of a brush frame 130 can be inserted. The scrub brush array 50 includes the brush frame 130 configured to support the previously described cylindrical brushes 75. The brush frame 130 is a rectangular framework consisting of a rectangular first end member 132 and a similar second end member 134 fastened to a pair of first split members 136a and a pair of second split members 136b with a plurality of fasteners 144. The brush frame 130 is comprised of extruded rigid thermoplastic pieces formed with the requisite features, including axle apertures 138, to accomplish the intended task of retaining a plurality of cylindrical brushes 75. Other materials, such as corrosion resistant metals, may be utilized without limiting the scope of the device 10. A first split member 136a is attached to a second split member 136, having the halves of the axle apertures 138 in alignment, by means of a plurality of evenly spaced fasteners 144. The end members 132, 134 are provided with a pair of tabs 142 extending from an exterior side surface. A preferred method of assembly for the brush frame 130 is to support a pair of second split members 136b upon an appropriate surface having the axle apertures 138 facing upwardly and aligned so that the axles 87 of each assembled cylindrical brush 75 can be placed therein. A pair of first split members 136a is then placed atop the corresponding second split member 136b with the axle apertures 138 faced downward and aligned with each axle 87. The split members 136a, 136b are then fastened together with the fasteners 144, thus clamping the axles 87 of each cylindrical brush 75. The end members 132, 134 are then fastened to the split members 136a, 136b by means of fasteners 144, ensuring that the tabs 142 are facing outward, away from the cylindrical brushes 75.

The key plate 42 is provided with a pair of sockets 44 conforming to the profile of the tabs 142 as seen in FIG. 5a. Similarly the adjustable clamp 46 is provided with a pair of sockets 44 as depicted in FIG. 5b. The tabs 142 of the first end member of the brush frame 130 are inserted into the sockets 44 of the key plate 42 located under the feed plate 110. The brush frame is then rotated to fit the first split members 136a into the undercuts 38 in the side frames 22a, 22b. It is envisioned that the adjustable clamp 46 under the exit plate 225 may be adapted in some sliding manner so as to secure the tabs 142 of the second end member 134 into the sockets 44 thereof so as to retain the scrub brush array 50 within the tray 20.

The preferred embodiment of the present invention can be utilized by the common user in a simple and effortless manner with little or no training. After initial purchase or acquisition of the device 10, it would be installed as indicated in FIG. 1. The method of utilizing the device 10 may be achieved by performing the following steps: acquiring a model of the device 10 of a desired length and width; placing the tray 20 upon dividing basin wall portions of an existing multi-basin sink; allowing an upper edge of a divider wall between the first sink basin and the second sink basin to protrude into either a first leg groove 22a, or a second leg groove 22b in order to correctly position and orient the forward end 90; slidingly inserting the rail brush assembly 30 between the guide rails 120; utilizing a flow of water upon the top face 115 and the ridges 115 of the feed plate 110 and the scrub brush array 50 to pre-soak or wash the vegetable 15, as desired, using an existing faucet; allowing the water to run across the top face 112 into the water pan 170 through the gap 118; placing a vegetable 15, or several vegetables 15, onto the feed plate 110 while having the extender arm 230 of the rail brush assembly 30 positioned over the feed plate 110; grasping the handle 70 and moving the rail brush assembly 30 away from the feed plate 110 to engage the vegetable 15 within the sop brush 55; continuing to grasp the handle 70 to oscillate the rail brush assembly 30 in a reciprocating longitudinal direction 200, thereby entraining the vegetable 15 between the rail brush assembly 30 and the scrub brush array 50; allowing the angled upper brush bristles 195 to displace the vegetable 15 to traverse the scrub brush array 50; allowing dirt and debris to fall from the vegetable 15 through the scrub brush array 50 as the vegetable 15 makes its way down the tray 20; allowing the vegetable 15 to exit the device 10 and into the sink; repeating the aforementioned steps to scrub additional vegetables 15; and, benefiting from effective scrubbing of vegetables 15 afforded a user of the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:
1. A washing device, comprising:
a tray, comprising a loading end and an exit end:
   a first side frame, having a first loading end and a first exit end;
   a first leg extending outwardly from said first loading end at an angle;
   a second side frame, having a second loading end and a second exit end, said second side frame oriented parallel with said first side frame;
   a second leg extending outwardly from said second loading end at said angle; and,
   a feed plate connecting to and spanning a distance between said first and second side frames at said loading end; and, an exit plate connecting to and spanning a distance between said first and second side frames at said exit end;

a scrub brush array, attached to lower portions of said first and second side frames and fore of said feed plate;

a rail brush assembly slidably attachable to upper portions of said first and second side frames, capable of longitudinal motioning between said loading end and said exit end; and, a pan removably attached to an underside of said tray, subjacent to at least a portion of said scrub brush array, such that said at least one portion of said scrub brush array depends within said pan;

wherein an inclined plane is achieved when said device rests on said first and second legs and said first and second exit ends;

wherein said device is capable of being secured onto an edge of a sink;

wherein said feed plate is adapted to provide a loading area for at least one piece of foodstuff;

wherein said device is capable of cleaning said article of foodstuff;

wherein said device is capable of conveying said article of foodstuff from said loading end to said exit end; and, wherein said device is capable of conveying washing fluid and detritus therethrough.

2. The device of claim 1, wherein said tray further comprises at least one groove formed within each distal end of said first and second leg;

wherein said at least one groove is capable of accommodating an upper perimeter rim of said sink, thereby capably supporting said device thereon.

3. The device of claim 2, further comprising a first groove extending to a first distance of each said first and second leg, relative to said distal end and a second groove extending to a second distance of each said first and second leg, relative to said distal end;

wherein said first groove and said second groove run parallel to each other; and, wherein said second distance is greater than said first distance.

4. The device of claim 1, wherein said feed plate is oriented such that an upper surface is parallel with an upper surface of each of said first and second side frames.

5. The device of claim 4, wherein said feed plate further comprises ribs located on a lower surface thereof.

6. The device of claim 4, wherein said feed plate further comprises a plurality of angled ridges adapted to direct a flow of water impinging thereon towards said scrub brush array.

7. The device of claim 4, further comprising a backsplash affixed to upper surfaces of said first and second loading ends, immediately above and behind said feed plate.

8. The device of claim 1, wherein said scrub brush array further comprises:

a scrub brush frame having a pair of upper members each affixed to an undercut located on lower portions of said first and second side frames, a pair of lower split members each attached to one of said pair of upper split members, a loading frame member affixed to first ends of said pair of upper and lower split members, and an exit frame member affixed to second ends of said pair of upper and lower split members;

a pair of first tabs protruding outwardly from said loading frame member;

a key plate, affixed to said first and second side frames subjacent to said feed plate, comprising a pair of first sockets each capable of receiving one of said pair of first tabs;

an adjustable clamp adjustable attached to said exit plate, comprising a pair of second sockets each capable of receiving one of said pair of second tabs;

a pair of second tabs protruding outwardly from said exit frame member;

a plurality of brush bodies, each further comprising:

an axle, affixed between a first upper split member and first lower split member at a first end and an opposing second upper split member and second lower split member at a second end;

a brush shaft circumscribing said axle and rotatable relative thereto; and, a plurality of scrub bristles each affixed to an outer surface of said brush shaft;

wherein at least a portion of said plurality of bristles of each of said plurality of brush bodies extends within said pan.

9. The device of claim 8, wherein said plurality of brush bodies comprise a cylindrical shape.

10. The device of claim 9, wherein said plurality of scrub bristles are nylon.

11. The device of claim 1, wherein said rail brush assembly further comprises:

a first guide rail attached to said first side frame and longitudinally extending between said first loading end and said first exit end;

a second guide rail attached to said second side frame and longitudinally extending between said second loading end and said second exit end;

a rail brush housing, slidingly engaging each said first and second guide rail, comprising:

a handle affixed to an upper surface thereof;

a rail brush head affixed to an under surface of a majority area of said rail brush housing, adjacent a first end thereof;

a plurality of rail bristles each affixed to an outer surface of said rail brush head at a bristle angle directed away from a first side of said rail housing and depending downward therefrom;

a soaking brush affixed to said rail brush housing at said first end and extending outwardly therefrom; and, an extender arm affixed to said rail brush housing at said first end and projecting away therefrom adjacent to said soaking brush.

12. The device of claim 11, wherein said plurality of rail bristles are nylon.

13. The device of claim 11, wherein said soaking brush comprises a high-absorption material.

14. The device of claim 11, wherein said rail brush head comprises a plurality of uniformly-shaped pieces.

15. The device of claim 1, wherein said first and second guide rails extend from said backsplash to a location fore of said exit plate.

16. The device of claim 1, wherein said first and second guide rails each have an inner side flush with respective inner sides of said first and second side frames.

17. The device of claim 1, wherein said soaking brush comprises a semi-circular shape.

18. The device of claim 1, wherein said first and second side frames have a square cross-sectional shape.

19. The device of claim 1, wherein said first and second side frames have a length of approximately forty-two inches.

20. The device of claim 19, wherein said first and second legs have a height of approximately seven inches.

* * * * *